UNITED STATES PATENT OFFICE.

DAMASE H. TETRAULT, OF ROUSES POINT, NEW YORK.

STOVE-POLISH.

No. 897,430.　　　Specification of Letters Patent.　　　Patented Sept. 1, 1908.

Application filed October 25, 1907. Serial No. 399,196.

*To all whom it may concern:*

Be it known that I, DAMASE H. TETRAULT, a citizen of the United States, residing at Rouses Point, in the county of Clinton and State of New York, have invented certain new and useful Improvements in Stove-Polish; and I do hereby declare the following to be a full, clear, and exact description of the invention, such as will enable others skilled in the art to which it appertains to make and use the same.

My invention relates to stove polishes.

It has for its object to produce an improved polish for stoves, steam boilers and the like which will protect them from rust and retain its luster for a long time.

The invention consists of the compound of substances and method of preparing and mixing them hereinafter described and specified in the claims.

The ingredients used to make my stove polish are graphite, lard, soap and resin. I first take about one pound of finely ground graphite, one and one half ounces of common soap and boil them with two quarts of water. Then one quarter of an ounce of resin and an equal part of lard are melted together and when the first mixture boils the two are poured together and the boiling continued until the compound becomes as thick as cream. When set it is ready for use. The soap used is preferably a household soap made from lye and tallow. Care should be taken not to mix the resin and lard with the water solution until the latter boils. The proportions of the ingredients may be stated as one part each of lard and resin, six parts of soap and sixty-four parts of graphite, the proportions being determined by weight.

It should be understood that I do not restrict myself to the exact proportions specified herein as they may be varied without departing from my invention or sacrificing the advantages thereof.

This polish will protect iron or steel from rust or moisture as the lard and resin therein are both waterproof substances. A stove or steam boiler that has been polished with this preparation will retain its luster for a long time even if they are heated to a red heat.

I claim:

1. A stove polish consisting of graphite, soap, lard and resin.

2. A stove polish consisting of approximately sixty-four parts by weight of graphite, six parts of soap and one part each of lard and resin.

3. The method of preparing stove polish which consists in boiling graphite and soap in water, melting lard and resin together and boiling this mixture with the first one until the whole becomes as thick as cream.

In testimony whereof, I affix my signature, in presence of two witnesses.

DAMASE H. TETRAULT.

Witnesses:
　E. ELMER BULLIS,
　RALPH SEGUIN.